(12) United States Patent
Kraft et al.

(10) Patent No.: US 8,401,536 B2
(45) Date of Patent: Mar. 19, 2013

(54) MOBILE COMMUNICATION TERMINAL AND METHOD

(75) Inventors: Christian Rossing Kraft, Frederiksberg (DK); Thomas Bove, Copenhagen (DK); Frederik Gustav Westring, Frederiksberg (DK); Rachael Sleight, London (GB); Luke Miles, London (GB)

(73) Assignee: Nokia Corporation, Espoo (FI)

( * ) Notice: Subject to any disclaimer, the term of this patent is extended or adjusted under 35 U.S.C. 154(b) by 52 days.

(21) Appl. No.: 12/597,435

(22) PCT Filed: Jun. 20, 2007

(86) PCT No.: PCT/IB2007/001874
§ 371 (c)(1),
(2), (4) Date: Jun. 14, 2010

(87) PCT Pub. No.: WO2008/132536
PCT Pub. Date: Nov. 6, 2008

(65) Prior Publication Data
US 2010/0291911 A1 Nov. 18, 2010

Related U.S. Application Data

(60) Provisional application No. 60/914,111, filed on Apr. 26, 2007.

(51) Int. Cl.
*H04M 3/00* (2006.01)
(52) U.S. Cl. .................. 455/418; 455/575; 345/170
(58) Field of Classification Search .... 455/575.1–575.8; 345/170
See application file for complete search history.

(56) References Cited

U.S. PATENT DOCUMENTS

| 7,035,805 | B1 * | 4/2006 | Miller ........................... 704/275 |
| 7,673,255 | B2 * | 3/2010 | Schechter et al. ............ 715/838 |
| 2004/0022047 | A1 | 2/2004 | Okayasu |
| 2007/0139384 | A1 * | 6/2007 | Okayasu ....................... 345/170 |
| 2008/0233937 | A1 | 9/2008 | Tuorila et al. |

FOREIGN PATENT DOCUMENTS

| EP | 1469375 A | 10/2004 |
| GB | 2355145 A | 4/2001 |

OTHER PUBLICATIONS

Brett M. Christensen, "Use Alt + Tab to Cycle Through Open Applications", Copyright 2005. Feb. 22, 2006. Online URL: http://web.archive.org/web/20060222213558/http://www.hoax-slayer.com/alt-tab.html.*
Wikipedia: "Alt-Tab". Sep. 13, 2006. Online URL: http://web.archive.org/web/20060913000000/http://en.wikipedia.org/wiki/Alt-Tab.*
English W800i User Guide, Version R1a, Add ON2, Sony Ericsson Mobile Communications AB, Rretrieved from the Internet: http://www.sonyericsson.com/cws/download/1/234/311/1193013566/W800i_UG_AddOn2_R1a_EN.pdf [retrieved Oct. 23, 2009].
"International Search Report and the Written Opinion of the International Searching Authority", received in corresponding PCT Application No. PCT/IB2007/001874, Dated Nov. 6, 2008, 24 pages.

* cited by examiner

*Primary Examiner* — David Q Nguyen
(74) *Attorney, Agent, or Firm* — Harrington & Smith

(57) ABSTRACT

It is presented a method for providing a user interface of a portable electronic apparatus. The method comprises: detecting an actuation of a mode switch actuator associated with switching operational modes of the apparatus; determining a switching direction by determining whether the actuation is associated with a first switching direction or a second switching direction; determining a current operational mode; determining a new operational mode considering the switching direction and the current operational mode; and switching operational modes of the portable electronic apparatus from the current operational mode to the new operational mode. Corresponding portable electronic apparatuses and computer program product are also presented.

18 Claims, 4 Drawing Sheets

MOBILE COMMUNICATION TERMINAL AND METHOD

FIELD OF THE INVENTION

The present invention generally relates to mobile terminals and more particularly to user interfaces of mobile terminals.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. More recently, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, electronic games, calendar/organizer/time planner, word processing, etc. With this great number of applications, user interaction naturally becomes complex and somewhat difficult.

In the prior art, one attempt to simplify for users is to use two dimensional menus, allowing the user to see a large number of selectable applications simultaneously. However, switching from one application to the next is still a process which requires relatively focused attention by the user, even for the most common applications.

Consequently, there is a need to provide a mobile communication terminal and method providing a user interface with simpler and more intuitive selection of the most common applications.

SUMMARY

In view of the above, an objective of the invention is to solve or at least reduce the problems discussed above.

Generally, the above objectives are achieved by the attached independent patent claims.

According to a first aspect of the present invention there has been provided a method for providing a user interface of a portable electronic apparatus, the method comprising: detecting an actuation of a mode switch actuator associated with switching operational modes of the apparatus; determining a switching direction by determining whether the actuation is associated with a first switching direction or a second switching direction; determining a current operational mode; determining a new operational mode considering the switching direction and the current operational mode; and switching operational modes of the portable electronic apparatus from the current operational mode to the new operational mode. It is thus provided a way for the user to easily change operating mode of the portable electronic apparatus. This is a much simpler and quicker user operation than finding an application in a menu system.

The determining a new operational mode may involve: determining the new operational mode as a next operational mode after the currently active operational mode in a predefined circular list of operational modes when the switching direction is determined to be the first direction; and determining the new operational mode as a previous operational mode after the currently active operational mode in a predefined circular list of operational modes when the switching direction is determined to be the second direction. A circular list simplifies use of the method with a varying number of operational modes.

The current operational mode may be associated with a first main user application and the new operational mode may be associated with a second main user application.

The switching operational mode may involve presenting a user indication. The user indication emphasizes the switch of operational modes for the user.

The user indication may comprise at least one user indication selected from the group comprising a visual indication on a display of the apparatus, an audible indication and a tactile indication.

The switching operational modes may involve presenting an intermediate animation on the display before a screen for the new operational mode is displayed. An animation is effective in showing the user what is happening and can be enjoyable to watch.

The switching operational modes may involve presenting an animation on the display, the animation comprising sliding a screen for the new operational mode in from a side.

The predefined circular list of operational modes may comprise three operational modes.

The three operational modes may be a phone mode, a media player mode and a radio mode.

The switching operational modes may involve switching a backlight for keys of the portable electronic apparatus from a first configuration to a second configuration.

A second aspect of the present invention is a portable electronic apparatus having at least two operational modes comprising: a mode switch actuator and a controller, wherein: the controller is configured to detect an actuation of a user input associated with switching operational modes of the apparatus and to determine a switching direction associated with the user input; the controller is configured to determine a current operational mode being a currently active operational mode; the controller is configured to determine a new operational mode considering the switching direction; and the controller is configured to switch operational modes of the portable electronic apparatus from the current operational mode to the new operational mode in response to a detection of an actuation of the mode switch actuator.

The portable electronic apparatus may be a mobile communication terminal.

The mode switch actuator may be a slide key capable of being in a first directional position, a middle position and a second directional position, and the slide key may be biased to the middle position.

The first directional position may be associated with a first switching direction and the second directional position is associated with a second switching direction.

A third aspect of the present invention is a portable electronic apparatus having at least two operational modes comprising: a mode switch actuator; a controller; means for detecting an actuation of the mode switch actuator; means for determining a current operational mode being a currently active operational mode; means for determining a new operational mode; and means for switching operational mode of the portable electronic apparatus from the current operational mode to the new operational mode.

The portable electronic apparatus may be a mobile communication terminal.

A fourth aspect of the present invention is a computer program product comprising software instructions that, when executed in a portable electronic apparatus, performs the method according to the first aspect.

A fifth aspect of the invention is a user interface for a portable electronic apparatus having at least two operational modes, the user interface comprising: a mode switch actuator, wherein: the user interface is configured to detect an actuation of a user input associated with switching operational modes of the apparatus and to determine a switching direction associated with the user input; the user interface is configured to determine a current operational mode being a currently active operational mode; the user interface is configured to determine a new operational mode considering the switching direction; and the user interface is configured to switch operational modes of the portable electronic apparatus from the current operational mode to the new operational mode in response to a detection of an actuation of the mode switch actuator.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
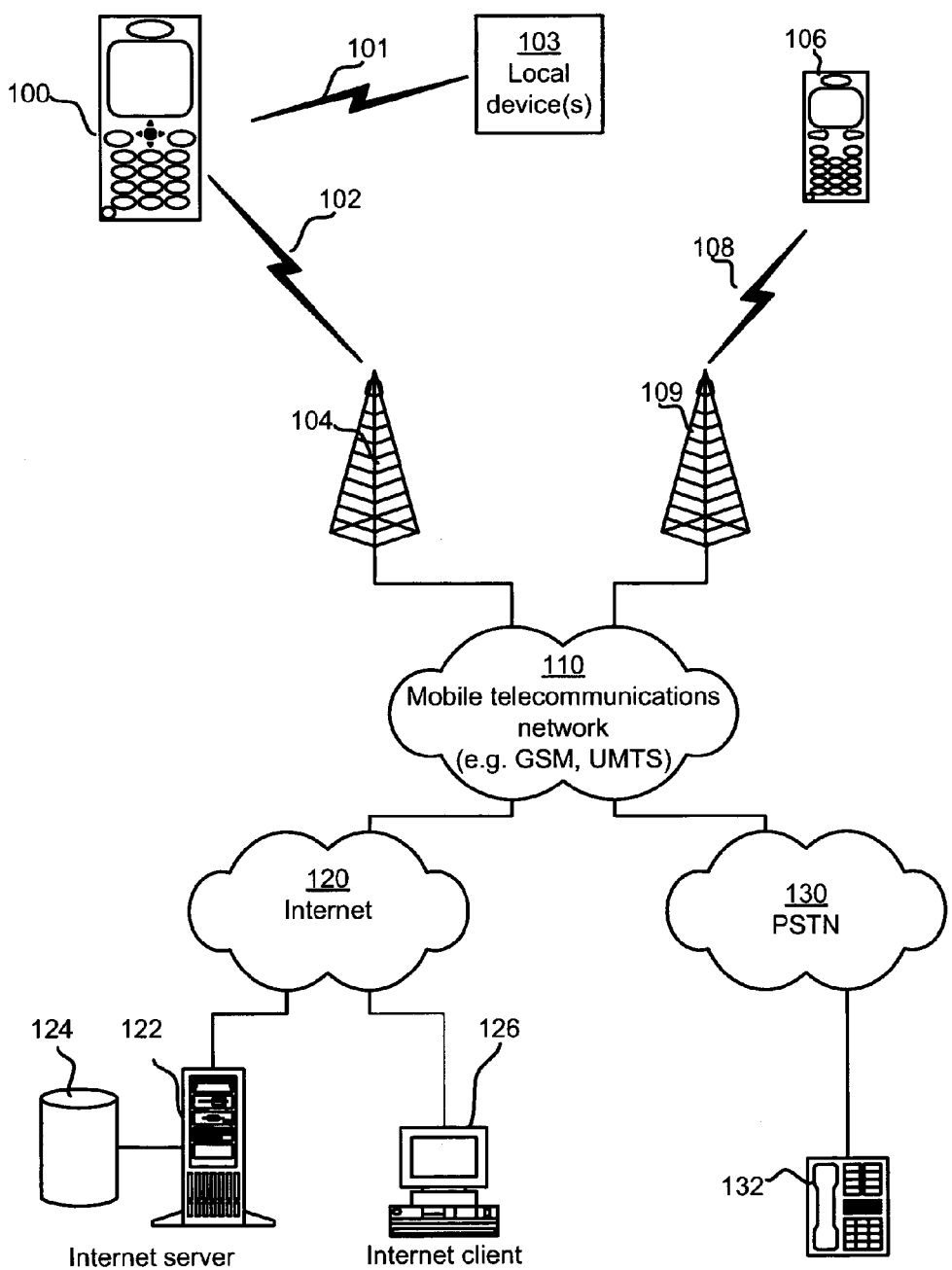
FIG. 1 is a schematic illustration of a cellular telecommunication system, as an example of an environment in which the present invention may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 132. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA or TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
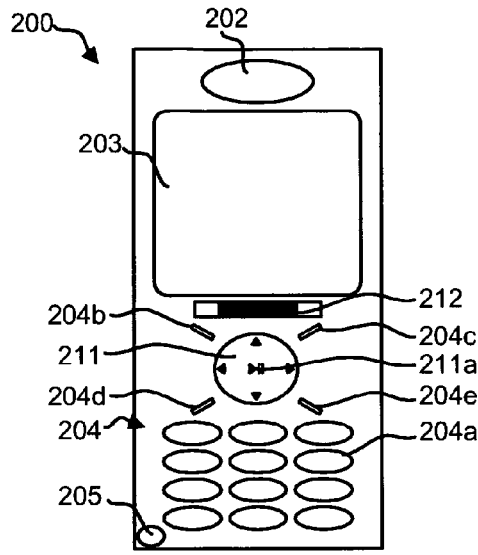
FIG. 2 is a schematic front view illustrating a mobile terminal according to an embodiment of the present invention.

An embodiment 200 of the mobile terminal 100 is illustrated in more detail in FIG. 2. The mobile terminal 200 comprises a speaker or earphone 202, a microphone 205, a display 203 and a set of keys 204 which may include a keypad 204a of common ITU-T type (alpha-numerical keypad representing characters "0"-"9", "*" and "#") and certain other keys such as soft keys 204b, 204c, a send-key 204d, and an end-key 204e. Moreover, a directional input 211 is provided, such as a joypad with a central button 211a, a joystick or other type of navigational input device. In this embodiment, the central button 211a functions, at least when it is applicable to a currently running application, for playing or pausing media.

A mode switch actuator 212 is also provided. The actuator is used to switch an operational mode of the mobile terminal. In this embodiment, the actuator is by default positioned in a middle position. When the user wants to switch modes, the actuator is moved to a left position or a right position and released, after which the actuator returns to the default middle position by mechanical means, such as a spring or similar. The mode switch actuator 212 could also be implemented by any type of input device capable of detecting at least two directional inputs, such as a dual spring loaded key, a touch pad, a rocker switch, any other type of bi-directional rotational device, etc.

Backlights are arranged by all keys 204, the directional input 211 as well as by the mode switch actuator 212.

Figure 3:
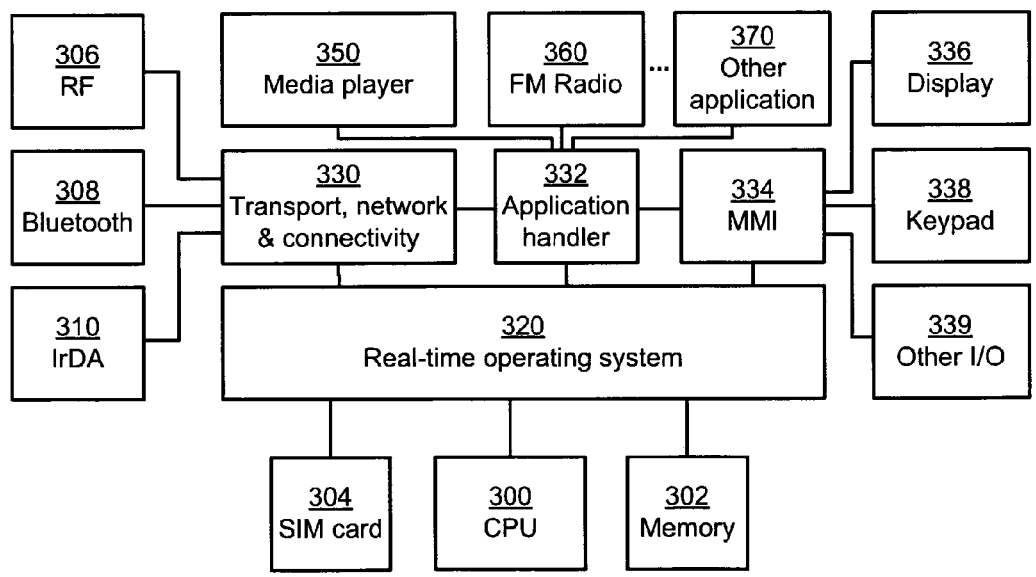
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 300 which is responsible for the overall operation of the mobile terminal and is preferably implemented by any commercially available CPU ("Central Processing Unit"), DSP ("Digital Signal Processor") or any other electronic programmable logic device.

The controller 300 has associated electronic memory 302 such as RAM memory, ROM memory, EEPROM memory, flash memory, hard drive, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications can include a media player application 350, an FM radio application 360, as well as various other applications 370, such as applications for voice calling, video calling, sending and receiving SMS, MMS or email, web browsing, an instant messaging application, a phone book application, a calendar application, a control panel application, a camera application, one or more video games, a notepad application, etc.

The MMI 334 also includes one or more hardware controllers, which together with the MMI drivers cooperate with the display 336/203, keypad 338/204 as well as various other I/O devices such as the mode switch key 212, microphone 205, speaker 202, vibrator, ringtone generator, LED indicator, backlight, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 or other suitable interfaces for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
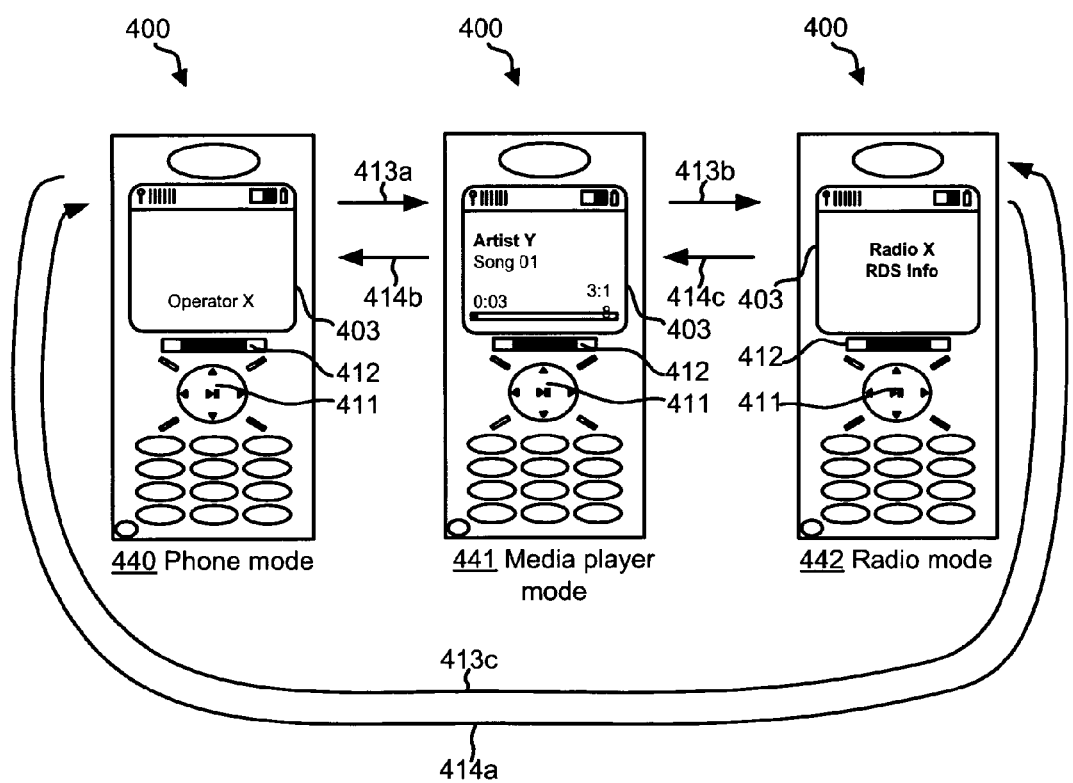
FIG. 4 is a schematic diagram showing how operational modes can be switched in the mobile terminal of FIG. 2.

FIG. 4 shows how operational modes can be switched in an embodiment of the present invention. The mobile terminal 400, such as mobile terminal 200 of FIG. 2, comprises a display 403, such as display 203 of FIG. 2, a joypad 411, such as joypad 211 of FIG. 2, and a mode switch key 412 such as mode switch actuator 212 of FIG. 2, to allow the user to switch operational modes.

Operational modes are modes where the mobile terminal 400 behaves in specific ways. For example, FIG. 4 shows three operational modes: a phone mode 440, a media player mode 441 and a radio mode 442. Each operational mode allows the mobile terminal to focus on a main user application, or functionality of that mode, allowing for predictable use. Each operational mode can change the behavior of the keypad, menu structure, idle screen, etc.

When the mobile terminal 400 is in the phone mode 440, the mobile terminal behaves as a user would expect a regular mobile terminal to behave. In other words, a menu system and/or shortcuts allow the user to instruct the mobile terminal to perform a desired function, such as voice telephony, www/wap browsing, video telephony, electronic messaging (e.g. SMS, MMS, email, instant messaging), digital image or video recording, electronic games, calendar/organizer/time planner, word processing, etc.

When the mobile terminal 400 is in the media player mode 441, the main purpose of the mobile terminal is to play media to the user. For example, the media player can play music or sound files, such as MP3 (mpeg-1 audio layer 3) files, AAC (advanced audio coding) files or ogg files. Optionally, the media player can also be used to play video files according to standards such as MPEG-2, MPEG-4 or H.264.

Finally, when the mobile terminal 400 is in the radio mode 442, the main purpose of the mobile terminal is to allow the user to listen to FM radio. Optionally, favorite radio stations can be stored, and text data by means of radio data system (RDS) can be presented on the display 403.

As the user switches operational modes with mode switch actuator 412 either to the right or to the left, the modes are switched serially, as indicated by arrows 413a-c to the right and arrows 414a-c to the left. In the illustrated embodiment, there is a circular list of operational modes consisting of the phone mode 440, the media player mode 441, and the radio mode 442, in that order. Consequently, when the mobile terminal 400 is in the phone mode 440 and the user actuates the mode switch actuator 412 to the right, the mobile terminal switches to the media player mode 441. On the other hand, if the user actuates the mode switch actuator 412 to the left while in the phone mode 440, the phone switches to the radio mode 442. Similarly, when the mobile terminal 400 is in the media player mode 441, the mobile terminal 400 switches to the radio mode 442 if the user actuates the mode switch actuator 412 to the right, or to the phone mode 440 if the user actuates the mode switch actuator 412 to the left. Moreover, when the mobile terminal 400 is in the radio mode 442, the mobile terminal 400 switches to the phone mode 440 if the user actuates the mode switch actuator 412 to the right, or to the media player mode 441 if the user actuates the mode switch actuator 412 to the left.

In the present embodiment, the initial states of the different operational modes when these are switched to in the present embodiment will now be described.

When the mobile terminal switches operational modes to the phone mode 440, the state of the phone mode 440 is the same as when it was last exited. E.g. if the user was writing a text message when the phone mode 440 was last exited, the same text message entry screen is displayed when the phone mode 440 becomes active again.

When the mobile terminal switches to the media player mode 441, a screen displaying currently playing media is displayed, regardless of the state when the media player mode 441 was last exited.

When the mobile terminal switches to the radio mode 442, the main radio screen is always shown initially, regardless what state the radio application was in the last time it was active. In this embodiment, the user has to initiate the radio playing in the application, at which time the user is informed if there is no antenna connected. In other words, the radio does not generate any sound until the user has pressed "play" e.g. by pressing the central joypad button 211a. If the media player is active playing audio prior to switching to the radio application, this audio keeps playing until the radio actually starts playing and generating sound.

Figure 5:
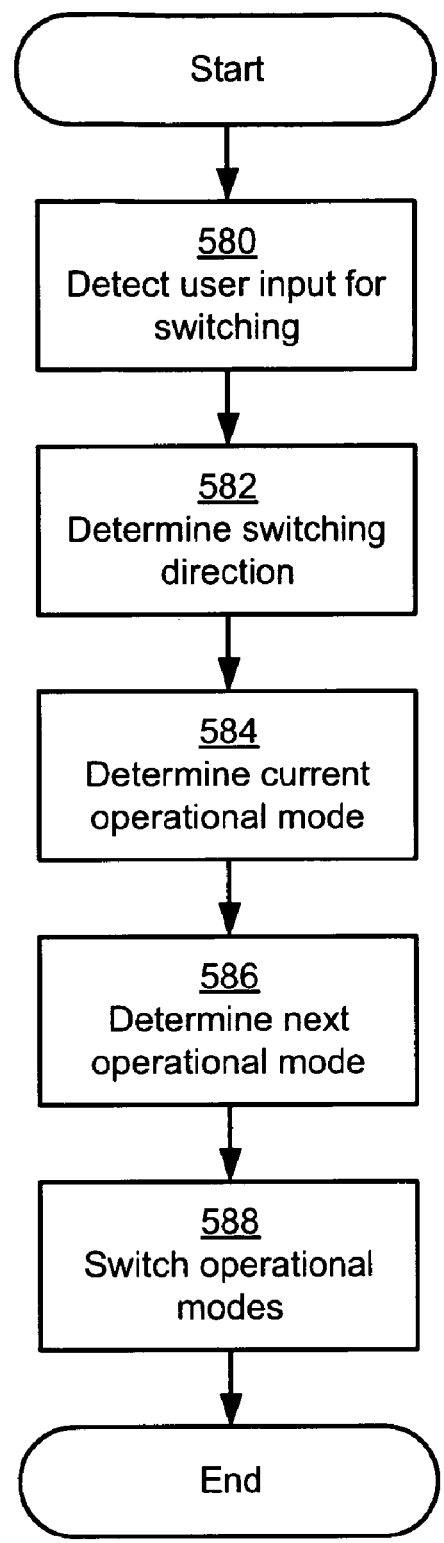
FIG. 5 is a flow chart illustrating the process illustrated in FIG. 4.

FIG. 5 is a flow chart illustrating the process illustrated in FIG. 4.

In a detect user input for switching step 580, it is detected that the user has actuated a user input associated with switching operational mode.

In a determine switching direction step 582, it is determined which direction the user input is associated with. The direction could be right, left, or even up or down.

In a determine current operational mode step 584, it is determined what operational mode the mobile terminal is in presently.

In a determine next operational mode step 586, the current operational mode and the direction associated with the user input are used to determine the next operational mode to switch to. More concrete examples of this step is described with reference to FIG. 4 above.

In a switch operational mode step 588, the operational mode of the mobile terminal is switched to the previously determined next operational mode.

Various animations are possible when switching from one mode to the next. Now a number of alternative animations will be presented:

- The screen for the new operational mode slides in over the current screen, optionally from the direction indicated by the user input.
- The screen for the new operational mode quickly replaces the current screen, after which an informational screen indicating the new operational mode slides in and out. The informational screen can contain text and/or graphics indicating the new operational mode.
- An informational screen indicating the new operational mode quickly replaces the current screen. A semi-transparent or solid colored bar slides over the informational screen, after which the new operational mode is displayed.
- An informational screen indicating the new operational mode quickly replaces the current screen. In this animation, however, the informational screen is semi-transparent such that the new operational mode can be seen behind the informational screen. A semi-transparent or solid colored bar slides over the informational screen, after which the informational screen is removed and the new operational mode becomes fully visible.
- A 3D animation is shown indicating a movement from the first operational mode to the second operational mode. For example, the animation can show a rotation of blocks for the different operational modes, where each block comprises text and/or graphics indicating the operational mode it is associated with.
- The screen for the new operational mode quickly replaces the current screen, after which a text and/or graphics item slides in and out over the screen.

Additionally, other user indications can be given when the actual mode change occurs. For example, the vibrator may vibrate on a mode change, where the vibration is either always identical for all modes or every mode has a particular vibration associated with it. Additionally, a sound effect or speech synthesizer pronouncing the new mode can be played to the user.

It is to be noted that while the modes are switched, certain appropriate processing of an inactive mode can still be performed. For example, the radio can let the user hear an FM radio station while the mobile terminal is in the phone mode, or the phone application can temporarily interrupt current processing if an incoming phone call is detected.

To allow the user to easily determine what mode is currently used, elements of the user interface are specific for each mode. There are a multitude of distinguishing user interface elements that can vary to allow the user to see what mode is currently active, e.g., a light by the joypad 211 can be on or off or optionally change color, the background on the display 403 can have different colors or appearances, or the entire theme of the user interface with colors and fonts can change.

One embodiment will now be described to illustrate an example where different states are indicated using lights by input elements of the mobile terminal.

When the mobile terminal is in the phone mode 440 and the user interface is active, there is a light by each of the keys, such as the soft keys 204*b-c*, the send key 204*d*, the end key 204*e* and keypad 204*a*. Furthermore, there is a ring of light around the joypad 211 and a backlight of the mode switch actuator 212.

When the mobile terminal is in the phone mode 440 and the user interface is inactive (due to a certain period of user inactivity), all the backlights are turned off. This reduces the power consumption when the user is inactive.

When the mobile terminal is in the media player mode 441 or the radio mode 442 and the user interface active, there is a light by each of the keys, such as the soft keys 204*b-c*, the send key 204*d*, the end key 204*e* and keypad 204*a*. Furthermore, there is a ring of light around the joypad 211 and a backlight of the mode switch actuator 212, just as in the active phone mode 440. However, here also the center button 211*a* of the joypad is illuminated, whereby the user can see the symbol for play/pause which is otherwise partially or completely invisible.

When the mobile terminal is in the media player mode 441 or the radio mode 442 and the user interface is inactive (due to a certain period of user inactivity), all the backlights are turned off. However, the center button 211*a* of the joypad is illuminated with light pulses periodically. This reduces the power consumption when the user is inactive, while still indicating to the user the much used play/pause functionality of the center button 211*a* of the joypad.

While the an embodiment of the invention is described above as embodied in a mobile terminal, the invention can be implemented in any type of portable electronic apparatus.

It is to be noted that the number and function of the operational modes mentioned above are only examples and the scope of the present invention covers any number of operational modes with any type of functionality. In one embodiment, the user may configure what main user application is associated with each operational mode, and optionally reorder the operational modes. In one embodiment, certain operational modes can be associated with specific applications selected by an operator, e.g. applications specifically developed or customized for that operator to increase operator visibility in the mobile terminal. Optionally, one of the operational modes can be fixed, such as the phone mode 440, preventing the user from changing the function of that mode.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing a user interface of a portable electronic apparatus, said method comprising:
   - detecting an actuation of a mode switch actuator, said mode switch actuator being capable of detecting at least two directional inputs;
   - determining a switching direction by determining whether said actuation is associated with a first switching direction or a second switching direction;
   - determining a current operational mode configured for using a first service provided over determining a new operational mode different from said current operational mode by considering said switching direction and said current operational mode, said new operational mode providing a user interface different from a user interface of said current operational mode; and switching operational modes of said portable electronic apparatus from said current operational mode to said new operational mode.

2. The method according to claim 1, wherein said determining a new operational mode includes:

determining said new operational mode as a next operational mode after said current operational mode in a predefined circular list of operational modes when said switching direction is determined to be said first switching direction; and determining said new operational mode as a previous operational mode before said current operational mode in the predefined circular list of operational modes when said switching direction is determined to be said second switching direction.

3. The method according to claim 1, wherein said current operational mode is associated with a first main user application and said new operational mode is associated with a second main user application, the first main user application comprising at least one of: cellular voice calls, www/wap browsing, cellular video calls, data calls, facsimile transmissions, music transmissions, still image transmissions, video transmissions, electronic message transmissions, and electronic commerce; the second main user application being different from the first main user application, the second main user application comprising at least one of: cellular voice calls, www/wap browsing, cellular video calls, data calls, facsimile transmissions, music transmissions, still image transmissions, video transmissions, electronic message transmissions, and electronic commerce.

4. The method according to claim 1, wherein said switching operational modes includes presenting a user indication.

5. The method according to claim 4, wherein said user indication comprises at least one user indication selected from the group consisting of a visual indication on a display of said apparatus, an audible indication and a tactile indication.

6. The method according to claim 4, wherein said switching operational modes involves presenting an intermediate animation on a display before a screen for said new operational mode is displayed.

7. The method according to claim 4, wherein said switching operational modes involves presenting an animation on a display, said animation comprising sliding a screen for said new operational mode in from a side.

8. The method according to claim 2, wherein said predefined circular list of operational modes comprises three or more operational modes.

9. The method according to claim 8, wherein said three or more operational modes include at least a phone mode, a media player mode and a radio mode.

10. The method according to claim 1, wherein said switching operational modes involves switching a backlight for keys of said portable electronic apparatus from a first configuration to a second configuration.

11. A portable electronic apparatus having at least two operational modes comprising:

a mode switch actuator, said mode switch actuator being capable of detecting at least two directional inputs, and a controller, wherein:

said controller is configured to detect an actuation of said mode switch actuator and to determine a switching direction;

said controller is configured to determine a current operational mode;

said controller is configured to determine a new operational mode different from said current operational mode by considering said switching direction and said current operational mode, said new operational mode providing a user interface different from a user interface of said current operational mode; and said controller is configured to switch operational modes of said portable electronic apparatus from said current operational mode to said new operational mode in response to a detection of an actuation of said mode switch actuator.

12. The portable electronic apparatus according to claim 11 wherein said portable electronic apparatus is a mobile communication terminal.

13. The portable electronic apparatus according to claim 11, wherein:

said mode switch actuator is a slide key capable of being in a first directional position, a middle position and a second directional position, and said slide key is biased to said middle position.

14. The portable electronic apparatus according to claim 13, wherein said first directional position is associated with a first switching direction and said second directional position is associated with a second switching direction.

15. A portable electronic apparatus having at least two operational modes comprising:

a mode switch actuator, said mode switch actuator being capable of detecting at least two directional inputs;

a controller;

means for detecting an actuation of said mode switch actuator;

means for determining a switching direction of said actuation;

means for determining a current operational mode;

means for determining a new operational mode different from said current operational mode by considering said switching direction and said current operational mode, said new operational mode providing a user interface different from a user interface of said current operational mode; and means for switching an operational mode of said portable electronic apparatus from said current operational mode to said new operational mode.

16. The portable electronic apparatus according to claim 15, wherein said portable electronic apparatus is a mobile communication terminal.

17. A computer program product stored in a non-transitory computer-readable storage medium and comprising software instructions that, when executed in a portable electronic apparatus, performs the method according to claim 1.

18. A user interface for a portable electronic apparatus having at least two operational modes, said user interface comprising:

a mode switch actuator, said mode switch actuator being capable of detecting at least two directional inputs, wherein:

said user interface is configured to detect an actuation of said mode switch actuator and to determine a switching direction of said actuation;

said user interface is configured to determine a current operational mode;

said user interface is configured to determine a new operational mode different from said current operational mode by considering said switching direction and said current operational mode, said new operational mode being different from said current operational mode;

said user interface is configured to switch operational modes of said portable electronic apparatus from said current operational mode to said new operational mode in response to a detection of an actuation of said mode switch actuator; and said user interface is changed when said portable electronic apparatus is switched from said current operational mode to said new operational mode.

* * * * *

UNITED STATES PATENT AND TRADEMARK OFFICE
CERTIFICATE OF CORRECTION

PATENT NO. : 8,401,536 B2
APPLICATION NO. : 12/597435
DATED : March 19, 2013
INVENTOR(S) : Christian Rossing Kraft et al.

It is certified that error appears in the above-identified patent and that said Letters Patent is hereby corrected as shown below:

In the Claims:

In Claim 1:

Column 8, line 63, -- ; -- should be inserted after "mode".

Column 8, lines 63-64, "configured for using a first service provided over" should be deleted.

Signed and Sealed this
Fourteenth Day of May, 2013

Teresa Stanek Rea
*Acting Director of the United States Patent and Trademark Office*